(12) United States Patent
Park et al.

(10) Patent No.: US 8,976,473 B1
(45) Date of Patent: Mar. 10, 2015

(54) INTER-TRACK INTERFERENCE CANCELLATION BASED ON PREDETERMINED DATA PATTERNS IN ADJACENT TRACKS

(71) Applicant: Seagate Technology LLC, Cupertino, CA (US)

(72) Inventors: Donghyuk Park, Seoul (KR); Mansik Shim, Hwaseong-si (KR); Jiyoung Lee, Hwaseong-si (KR); Taehoon Lee, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/284,267

(22) Filed: May 21, 2014

(51) Int. Cl.
  *G11B 20/10* (2006.01)
(52) U.S. Cl.
  CPC .................. *G11B 20/10009* (2013.01)
  USPC ............................................. 360/39; 360/55
(58) Field of Classification Search
  None
  See application file for complete search history.

(56) References Cited

U.S. PATENT DOCUMENTS

| | | | |
|---|---|---|---|
| 5,721,816 | A | 2/1998 | Kusbel et al. |
| 7,493,550 | B1 | 2/2009 | Kou et al. |
| 8,300,339 | B1 | 10/2012 | Nangare et al. |
| 8,379,498 | B2 | 2/2013 | Mathew et al. |
| 8,429,507 | B1 | 4/2013 | Kou et al. |
| 8,441,750 | B1 | 5/2013 | Nangare et al. |
| 8,537,482 | B1 | 9/2013 | Song et al. |
| 2008/0151704 | A1 | 6/2008 | Harada |
| 2008/0174905 | A1 | 7/2008 | Ueda |
| 2010/0290151 | A1 | 11/2010 | Kondo et al. |
| 2011/0292536 | A1 | 12/2011 | Hongawa et al. |
| 2012/0063022 | A1 | 3/2012 | Mathew et al. |
| 2012/0063023 | A1 | 3/2012 | Mathew et al. |
| 2012/0063024 | A1 | 3/2012 | Mathew et al. |
| 2012/0063284 | A1* | 3/2012 | Mathew et al. ............ 369/53.44 |
| 2012/0105994 | A1 | 5/2012 | Bellorado et al. |
| 2013/0003214 | A1* | 1/2013 | Grundvig et al. ............... 360/51 |
| 2013/0021689 | A1 | 1/2013 | Haratsch et al. |
| 2013/0070362 | A1 | 3/2013 | Mathew et al. |
| 2013/0083417 | A1 | 4/2013 | Worrell et al. |
| 2013/0083418 | A1 | 4/2013 | Worrell et al. |
| 2013/0194699 | A1 | 8/2013 | MATSUO et al. |
| 2013/0223199 | A1 | 8/2013 | LUND et al. |
| 2014/0029133 | A1 | 1/2014 | TAGAMI et al. |
| 2014/0071559 | A1 | 3/2014 | TODA et al. |

(Continued)

OTHER PUBLICATIONS

Chang, et al; "Inter Track Interference Mitigation for Bit-Patterned Magnetic Recording," IEEE Transaction on Magnetics, col. 46, No. 11, Nov. 2010; 10 pgs.

(Continued)

*Primary Examiner* — Thang Tran
(74) *Attorney, Agent, or Firm* — Taylor English Duma, LLP

(57) ABSTRACT

Technologies are described herein for cancelling adjacent track interference in a storage device using an ITI predictor determined from predetermined data patterns in adjacent tracks. A first signal is read from a first portion of a data track, the first portion containing a first predetermined data pattern. Next, a value for an inter-track interference predictor associated with an adjacent track is determined based on the first signal, the first predetermined data pattern, and a second predetermined data pattern contained in a corresponding portion of the adjacent track. A second signal is read from a second portion of the data track, and inter-track interference from the adjacent track in the second signal is cancelled utilizing the value for the inter-track interference predictor.

20 Claims, 6 Drawing Sheets

(56) References Cited

U.S. PATENT DOCUMENTS

2014/0078608 A1* 3/2014 Xiao et al. ............... 360/45
2014/0153126 A1* 6/2014 Mathew et al. ........... 360/45

OTHER PUBLICATIONS

Haratsch, et al.; "Intertrack Interference Cancellation for Shingled Magnetic Recording", IEEE Transactions on Magnetics, vol. 47, No. 10, Oct. 2011, 6 pgs.

Park, Donghyuk; Non-Final Office Action for U.S. Appl. No. 13/840,650, filed Mar. 15, 2013, mailed Mar. 25, 2014, 13 pgs.

Roh, et al.; "Single-Head/Single-Track Detection in Interfering Tracks", IEEE Transactions on Magnetics, vol. 38, No. 4, Jul. 2002, 9 pgs.

Jeong, Seungyoul; Non-Final Office Action for U.S. Appl. No. 13/942,163, filed Jul. 15, 2013, mailed May 7, 2014, 13 pgs.

Jeong, Seungyoul; U.S. Patent Application Entitled: Size Adjustable Inter-Track Interference Cancellation, U.S. Appl. No. 13/942,163, filed Jul. 15, 2013; 25 pgs.

Wikipedia; "Cross-correlation", located at "http://en.wikipedia.org/wiki/Cross-correlation", last modified on Feb. 25, 2013, 4 pgs.

Park, Donghyuk; U.S. Patent Application entitled: Detection of Adjacent Track Interference Using Size-Adjustable Window, having U.S. Appl. No. 13/840,650, filed Mar. 15, 2013, 26 pgs.

* cited by examiner

INTER-TRACK INTERFERENCE CANCELLATION BASED ON PREDETERMINED DATA PATTERNS IN ADJACENT TRACKS

BRIEF SUMMARY

The present disclosure relates to technologies for determining an inter-track interference predictor for an adjacent track of a storage device, such as a hard-disk drive ("HDD") device, based on predetermined data patterns in adjacent tracks, and utilizing the inter-track interference predictor to cancel adjacent track interference in a read signal. According to some embodiments, a method of cancelling adjacent track interference in a storage device comprises reading a first signal from a first portion of a data track, the first portion containing a first predetermined data pattern. Next, a value for an inter-track interference predictor associated with an adjacent track is determined based on the first signal, the first predetermined data pattern, and a second predetermined data pattern contained in a corresponding portion of the adjacent track. A second signal is read from a second portion of the data track, and inter-track interference from the adjacent track in the second signal is cancelled utilizing the value for the inter-track interference predictor.

According to further embodiments, a computer-readable storage medium comprises processor-executable instructions that, when executed by a processor, cause the processor to read a first signal from a first portion of a target data area on a first track of a recording medium, the first portion containing a first predetermined data pattern. The processor then determines an inter-track interference predictor value associated with an adjacent track of the recording medium based on the first signal, the first predetermined data pattern, and a second predetermined data pattern contained in a corresponding portion of the adjacent track. A second signal is read from a second portion of the target data area, and inter-track interference from the adjacent track in the second signal is cancelled utilizing the inter-track interference predictor value.

According to further embodiments, a system comprises a storage device comprising a storage medium, a processor operably connected to the storage device, and an inter-track interference compensation module. The inter-track interference compensation module may be configured to receive a first signal from a DAM of a target sector on a first track of a recording medium. The inter-track interference compensation module then determines an inter-track interference predictor value associated with an adjacent track of the recording medium based on the first signal, a known DAM pattern contained in the target sector, and a known DAM pattern contained in an aligned sector of the adjacent track. A second signal is read from the remainder of the target sector, and inter-track interference from the adjacent track in the second signal is cancelled utilizing the inter-track interference predictor value.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
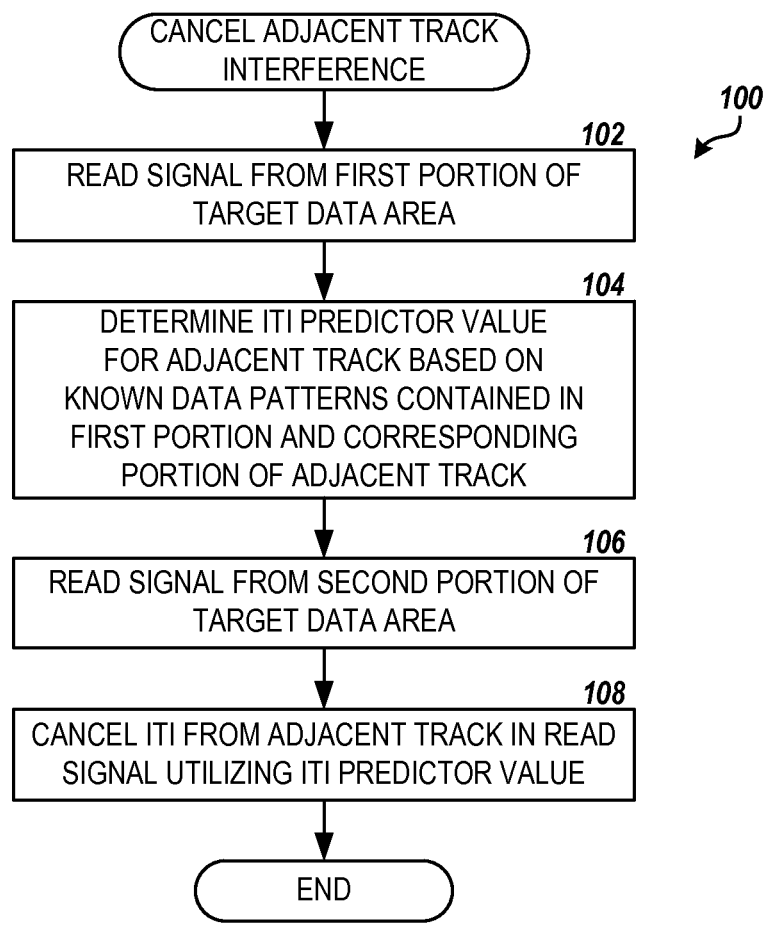
FIG. 1 is a flow diagram showing one method cancelling adjacent track interference based on predetermined data patterns in adjacent tracks, according to embodiments described herein.

The following detailed description is directed to technologies for cancelling adjacent track interference in a read signal using an inter-track interference predictor determined from predetermined data patterns in adjacent tracks. A typical storage device may include a hard-disk drive ("HDD") device. The HDD device may contain a number of magnetic storage disks that include a number of concentric data tracks, the data tracks divided into sectors that contain the data stored on the device. As the storage capacity of HDD devices increase, the density of data tracks on the storage disks may also increase. This increase in track density may give rise to inter-track interference ("ITI") comprising interference in the read signal from a reader head of the HDD device when reading a target data track (referred to as track N) caused by the data stored in adjacent or neighboring tracks (referred to as tracks N−1, N−2, N+1, N+2, etc.). The effect of ITI on the read signal may be further exacerbated by head misalignment, the size of the reader head, angle or skew of the reader head in regard to the target track N, or the use of shingled magnetic recording ("SMR") in recording the data tracks and the like.

The read channel and/or controller of a typical HDD device may include a mechanism for compensating for ITI in the read signal of a target data area when ITI is detected. For example, if a read error occurs while reading the target data area due to the presence of ITI, the ITI compensation ("ITIC") mechanism may read a signal from the target data area and use data from the adjacent tracks to determine an ITI factor describing the nature of the influence of the adjacent track data in the read signal. The ITI factor may include a "cross-correlation" factor that indicates a correlation between the signal from the target track and that of the adjacent track(s), an "alpha" factor indicating a magnitude of interference in the read signal from an adjacent track, and the like. The determined ITIC factor and the adjacent track data may then be utilized to mathematically cancel the inference from the adjacent track(s) in the read signal.

In conventional ITIC mechanisms, however, corrective action for adjacent track interference requires re-reading the signal from the target data area after the target data area is first read to determine the presence or absence of ITI. After the target data area is determined to be subject to adjacent track interference, the ITI factor is determined (or a previously determined ITI factor for the target data area is read from a memory) and utilized to cancel ITI in the read signal from the target data area. Thus conventional ITIC mechanisms require multiple reads of the same target data area.

According to embodiments presented herein, ITIC mechanisms may be implemented in a storage device that reliably predict the amount of ITI present in the target data area, such as a data sector, before the entire sector is read. The disclosed ITIC mechanisms allow ITIC to be applied to the read signal for the target sector without requiring multiple reads of the sector, thus improving reading performance of the storage device. The ITIC mechanisms use short, known data patterns, such as data address mark ("DAM") patterns, written to aligned sectors on adjacent tracks to determine an ITI predictor value from the read signal of the corresponding data pattern in the target sector. For example, two distinct DAM patterns may be written to adjacent sectors/tracks on the recording media of the storage device. When the DAM signal is read from the target sector, the ITIC mechanisms may compute the ITI predictor value from the read signal, the known DAM pattern of the target sector, and the known DAM patterns from one or more sectors in adjacent tracks. The ITI predictor value may be an ITI factor describing the nature of the influence of the adjacent track data in the read signal. Once the ITI predictor value is determined for the target sector, the remainder of the sector may be read while compensating for ITI in the read signal using the ITI predictor value.

FIG. 1 provides an overview of an improved ITIC mechanism according to the embodiments described herein. Specifically, FIG. 1 illustrates one routine 100 for cancelling adjacent track interference when reading data from a target data area in a storage device. According to some embodiments, the routine 100 may be performed by a controller of the storage device. The routine 100 includes step 102, where a signal is read from a first portion of the target data area. For example, the DAM pattern may be read from a target data sector on data track N. Next, the routine 100 proceeds to step 104, where an ITI predictor value is determined for each of one or more data tracks adjacent to the target data area. For example, an ITI predictor value for adjacent track N−1. The ITI predictor value may represent a reliable prediction of the influence of the data stored in the adjacent track N−1 in the read signal from target track N.

According to embodiments, the ITI predictor value may be determined based on the signal read from the first portion of the target data area and known data patterns contained in corresponding portions of the adjacent track N−1. For example, the recording media of the storage device may be formatted with specific and distinct DAM patterns written to adjacent sectors/tracks, as is described below in more detail in regard to FIG. 4. When the first portion of the target sector containing the DAM pattern is read, an ITI predictor value may be determined from the read signal, the known DAM pattern contained in the first portion, and the known DAM pattern of the adjacent sector on track N−1. In some embodiments, multiple ITI predictor values may be determined for multiple, adjacent tracks, such as track N+1, N−2, N+2, and the like.

From step 104, the routine 100 proceeds to step 106, where a signal is read from a second portion of the target data area. For example, the remainder of the target sector containing the user data may be read from track N. Next, the routine 100 proceeds to step 108, where the signal is decoded using the determined ITI predictor value(s) to compensate for ITI from the adjacent track(s) in the signal. For example, a conventional ITIC technique utilizing the ITI predictor value as the ITI factor may be used. In this way, the data from the target data area may be read and ITIC performed without first having to read the entire data area and determine whether ITI is present in the signal. From step 108, the routine 100 ends.

Figure 2:
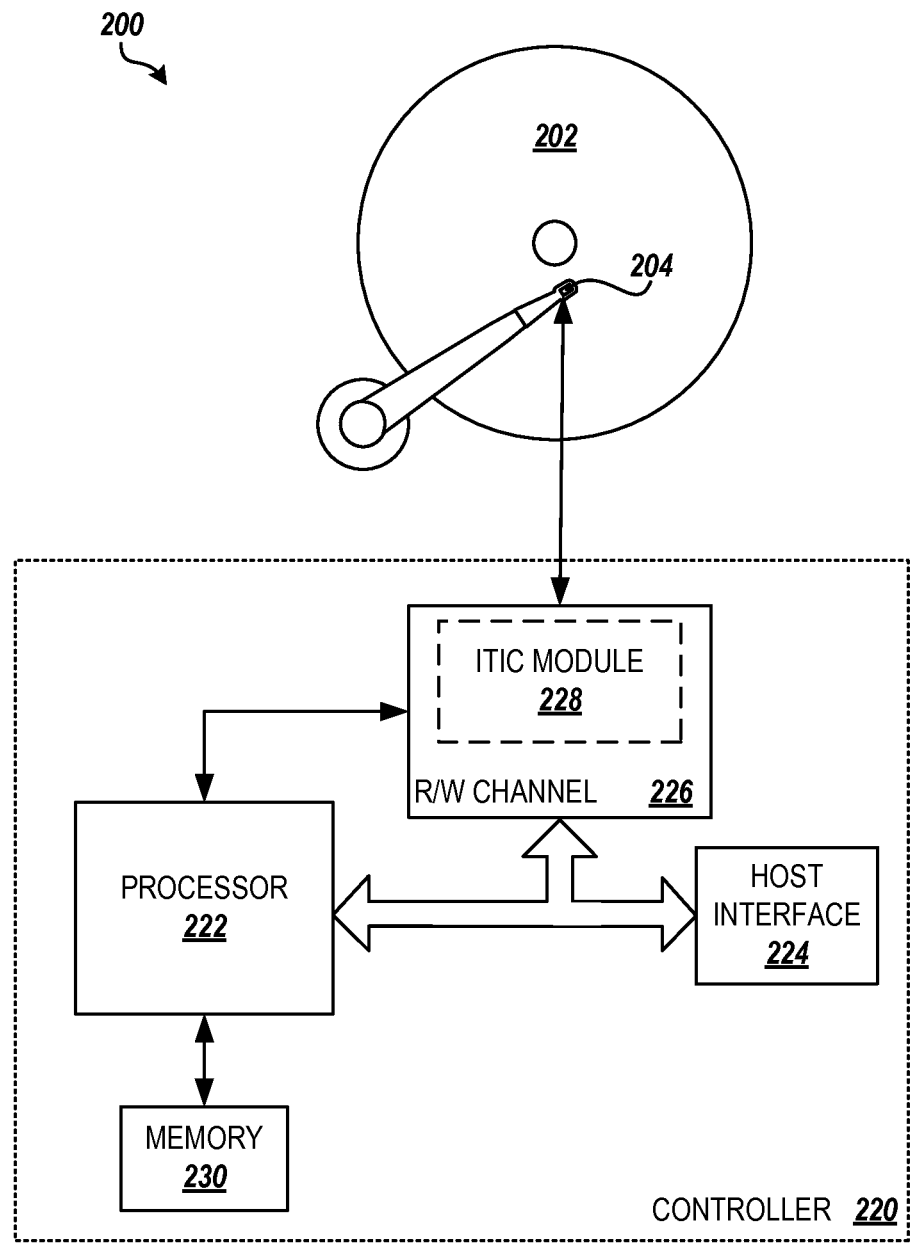
FIG. 2 is a block diagram showing an illustrative environment for cancelling adjacent track interference in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for cancelling adjacent track interference in the storage device 200, according to the embodiments provided herein. The storage device 200 may include storage media comprising at least one platter or disk 202.

The storage device 200 further includes at least one read/write head 204 located adjacent to the surface of each disk 202. The read/write head 204 may read information from the disk 202 by sensing a magnetic field formed on portions of the surface of the disk, and may write information to the disk by magnetizing a portion of the surface of the disk. It will be appreciated by one of ordinary skill in the art that the read/write head 204 may comprise multiple components, such as a magneto-resistive ("MR") or tunneling MR reader element, a writer element, an air bearing and the like.

Figure 3:
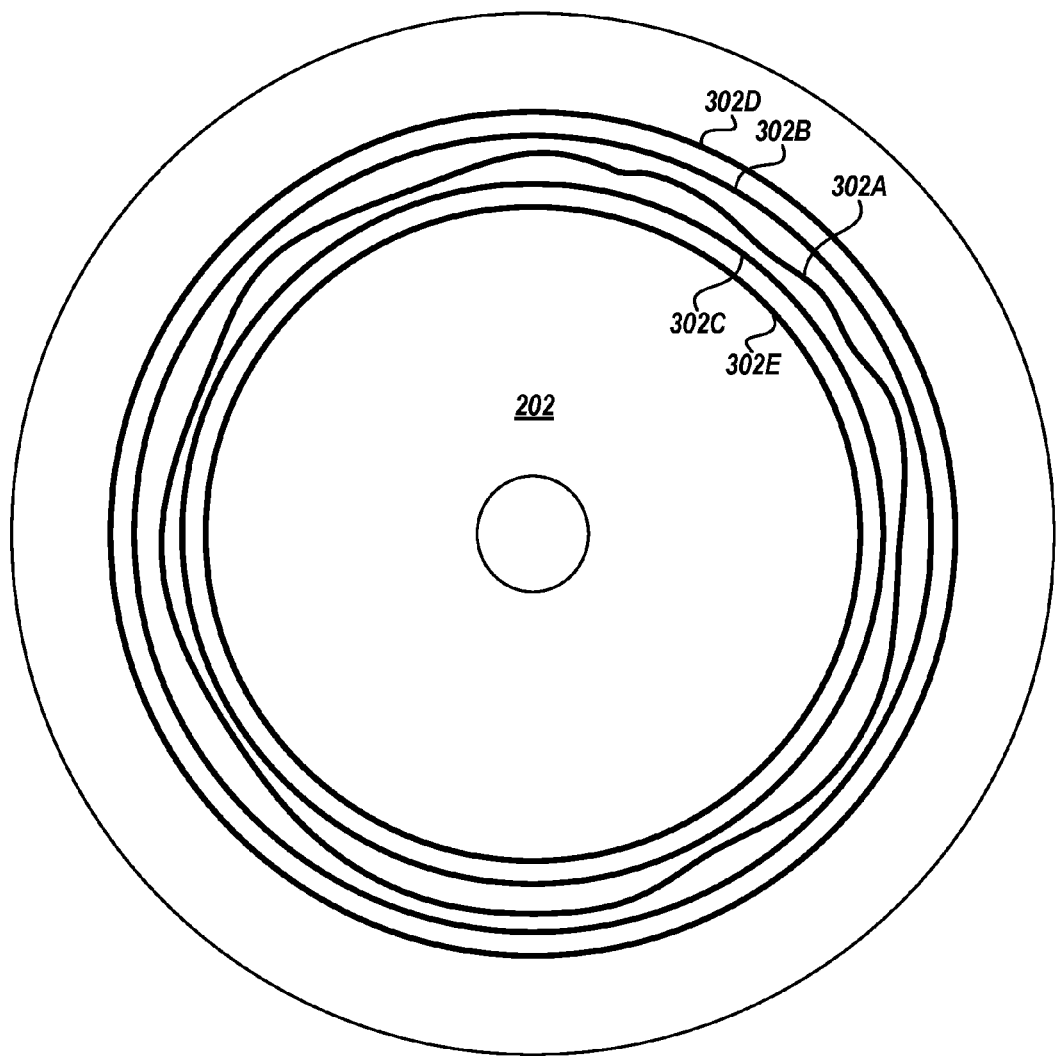
FIG. 3 is a block diagram showing an illustrative layout of data tracks on disk media, according to embodiments described herein.

The surface of the disk 202 may be divided or "formatted" into a number of individual data tracks, such as data tracks 302A-302E (referred to herein generally as data tracks 302) shown in FIG. 3. The data tracks 302 may represent substantially concentric circular areas on the surface of the disk 202. However, because of factors such as platter shift, platter geometry irregularity, vertical and horizontal platter vibrations, air fluctuations and the like, each data track may not be perfectly circular, such as data track 302A. Thus the distance between the centers of two adjacent data tracks, such as data track 302A (track N) and data track 302B (track N−1), may be different at various points along the data tracks, potentially causing the data stored in an adjacent track N−1 to influence the read signal read from data track N.

Figure 4:
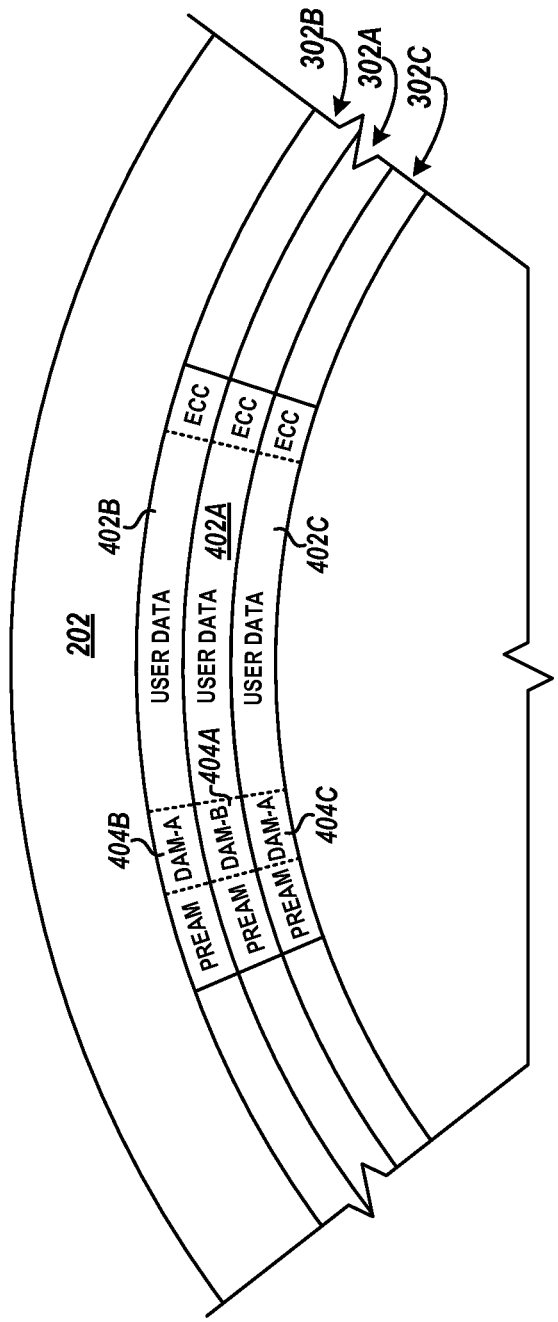
FIG. 4 is a block diagram showing an illustrative layout of sectors in data tracks on the disk media, according to embodiments described herein.

As shown in FIG. 4, each data track 302A-302C may further be divided or formatted into a number of data sectors, such as sectors 402A-402C (referred to herein generally as sectors 402). The sectors 402 may represent independent areas of the data track 302 in which user data is stored. The sectors 402 may be further divided into fields for storing various portions of the sector data according to a layout associated with the storage protocols of the storage device. In some embodiments, each sector 402 may contain a preamble, a data address mark ("DAM") 404A-404C (referred to herein generally as DAMs 404), user data, and error correction data. The DAM 404 may be a special field with a known, constant digital pattern stored therein that acts as a synchronization signal indicating to the controller of the storage device 200 that user data follows. The read signal corresponding to the DAM pattern may be immediately recognizable by the controller to indicate the start of user data, and therefore all DAMs 404 on a disk 202 conventionally have a same pattern written to them.

According to some embodiments, storage devices 200 implementing the ITIC mechanisms described herein may utilize two or more distinct DAM patterns for aligned sectors 402 on adjacent tracks 302. For example, a first DAM pattern, DAM-A, may be written to the each sector 402 of odd numbered tracks, such as data tracks 302B and 302C, while a second DAM pattern, DAM-B, may be written to each sector of even numbered tracks, such as data track 302A. The first DAM pattern and the second DAM pattern are selected in such a way so that the read signals from read/write head 204 when reading DAM-A or DAM-B are different and distinguishable. In one embodiment, DAM-A may comprise a 4.5 byte field containing the following pattern:

DAM-A=[−1, −1, −1, −1, 1, −1, 1, −1, 1, 1, 1, −1, 1, 1, −1, −1, −1, 1, 1, 1, 1, 1, −1, −1, 1, 1, −1, 1, −1, −1, 1]

while DAM-B comprises a 4.5 byte field containing the following pattern:

DAM-B=[−1, −1, −1, −1, 1, −1, 1, 1, −1, 1, −1, 1, −1, −1, 1, 1, 1, −1, 1, 1, 1, 1, 1, −1, −1, 1, −1, −1, 1, 1]

In this embodiment, since only two DAM patterns are utilized, the controller of the storage device 200 can still utilize the DAMs as synchronization signals, for example, by auto-correlating each signal, while utilizing the two different, known patterns to determine the ITI predictor value for the target sector in a read operation, as is described herein.

Conventionally, DAM patterns are selected to have good auto-correlation properties in order to support their use as synchronization patterns. In addition, the distinct DAM patterns utilized for the ITIC mechanisms described herein may be selected such that their corresponding read signals have a high cross-correlation in order to facilitate the calculation of the ITI predictor value, as is described in more detail below. It will be appreciated that more than two DAM patterns may be utilized in the described ITIC mechanisms, and that other sector layouts beyond that shown in FIG. 4 may also be utilized with the embodiments described herein. Further, the sector boundaries of sectors 402 on adjacent data tracks 302 may only align for tracks within a same zone on the disk 202. Thus, cancelling ITI from adjacent tracks 302 utilizing known, distinct DAM patterns, as described herein, may only work for data tracks in the same zone of a multi-zone formatted disk 202, according to some embodiments.

Returning to FIG. 2, the storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the surface of the disk 202. The processor 222 may further process read commands from the host device by determining the location of the desired data on the surface of the disk 202, moving the read/write head(s) 204 over the determined location, reading the data from the surface of the disk via the read/write channel 226, correcting any errors and formatting the data for transfer to the host device.

The read/write channel 226 may convert data between the digital signals processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned to read or write data to a specific sector 402 on the on the surface of the disk 202 by moving the read/write head 204 radially across the data tracks 302 using the actuator while a motor rotates the disk to bring the target sector under the read/write head.

According to embodiments, the controller 220 may further contain an ITIC module 228. The ITIC module 228 may compensate for inter-track interference and other noise in the read signal from the read/write head 204 when reading data. The ITIC module 228 may comprise a hardware circuit in the read/write channel 226, processor-executable instructions for execution in the processor 222 or any combination of these and other components in the controller 220. The ITIC module 228 may implement the ITIC mechanism(s) described herein. As described above, the ITIC module 228 may have the capability to determine an ITI predictor value based on the read signal from the DAM 404 a target sector 402, the known DAM pattern contained therein, and the DAM pattern contained in aligned sector(s) on an adjacent track 302. The ITIC module 228 may further have the capability to utilize the ITI predictor value to compensate for ITI from the adjacent track 302 in the read signal from the read/write head 204 when reading the remainder of the target sector 402.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the non-volatile memory and/or the RAM may store a firmware that comprises commands and data necessary for performing the operations of the storage device 200. According to some embodiments, the memory 230 may store processor-executable instructions that, when executed by the processor, perform the routines 100 and 600 for cancelling adjacent track interference in the storage device 200, as described herein.

In addition to the memory 230, the environment may include other computer-readable media storing program modules, data structures, and other data described herein for cancelling adjacent track interference in the storage device 200. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure and/or functionality of the storage device 200 may be different that that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 5:
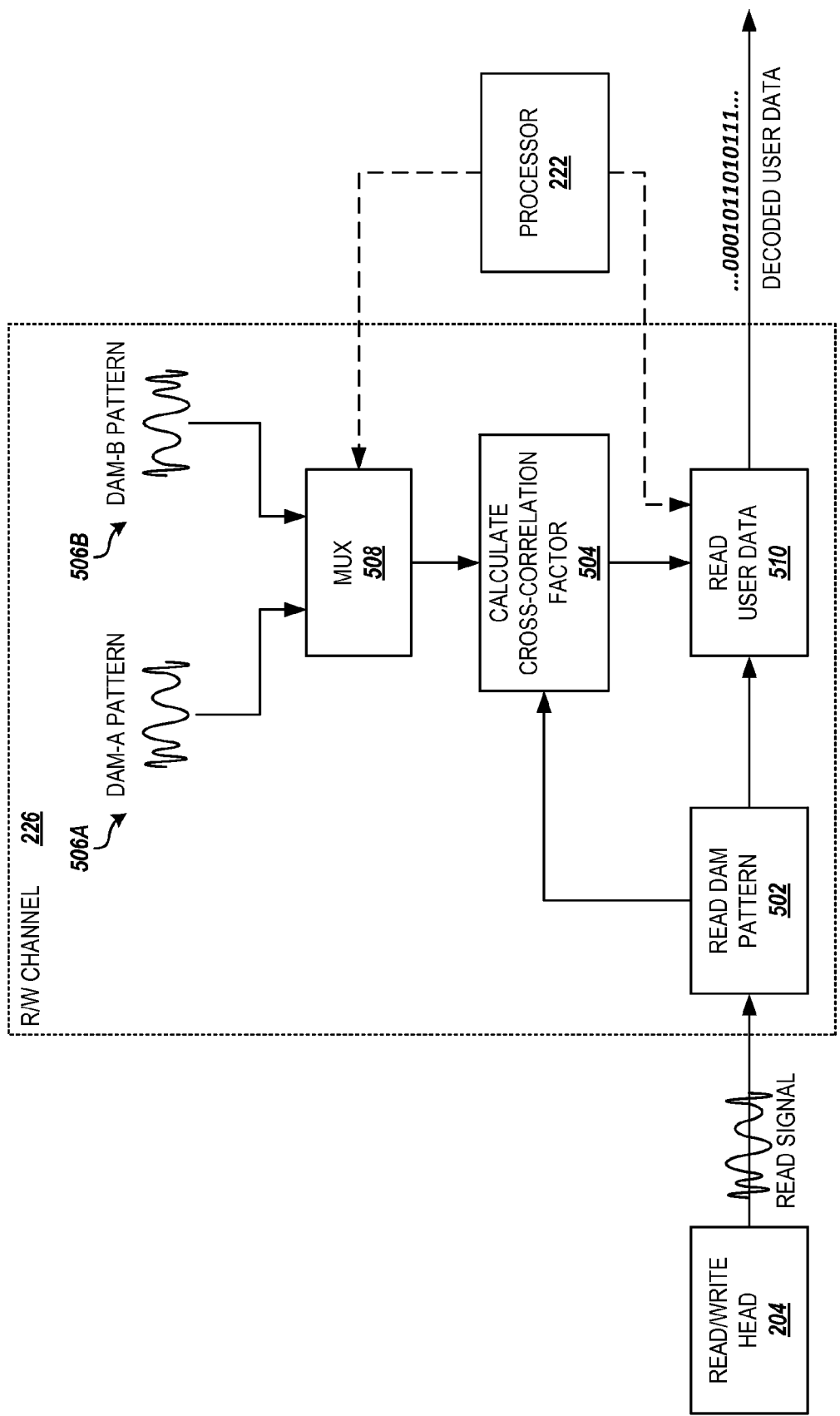
FIG. 5 is a block diagram showing additional details of components and steps for cancelling adjacent track interference using an inter-track interference predictor, according to some embodiments.

FIG. 5 provides additional details of components and steps for cancelling adjacent track interference using an inter-track interference predictor during a read operation of a target sector, such as sector 402A described above. As shown at 502, the DAM pattern may be detected in the read signal from the read/write head 204 as it passes over the first portion of the target sector 402A on the disk 202. The detected DAM pattern may then be utilized by the read/write channel 226 to calculate the ITI predictor value for an adjacent track, such as a cross-correlation factor for adjacent track N−1 302B, as shown at 504. The cross-correlation factor may be calculated in real-time from the DAM pattern detected from the read signal at 502 and the DAM pattern of the adjacent sector 402B in the adjacent track 302B.

If two distinct DAM patterns, DAM-A 506A and DAM-B 506B, are utilized in the format of the sectors of the disk 202, the processor 222 knows which DAM pattern is contained in the adjacent sector 402B and may utilize a MUX 508 or other component to provide the DAM pattern in the adjacent sector to the read/write channel 226 for calculation of the cross-correlation factor. Next, the user data from the target sector 402A is read from the read signal by the read/write channel 226 and any ITI from the adjacent track 302B may be compensated for using the cross-correlation factor calculated at 504 and the data pattern stored in the adjacent sector 402B provided by the processor 222, as shown at 510. In further embodiments, the functions described above may be performed multiple times in parallel for two or more adjacent tracks.

Figure 6:
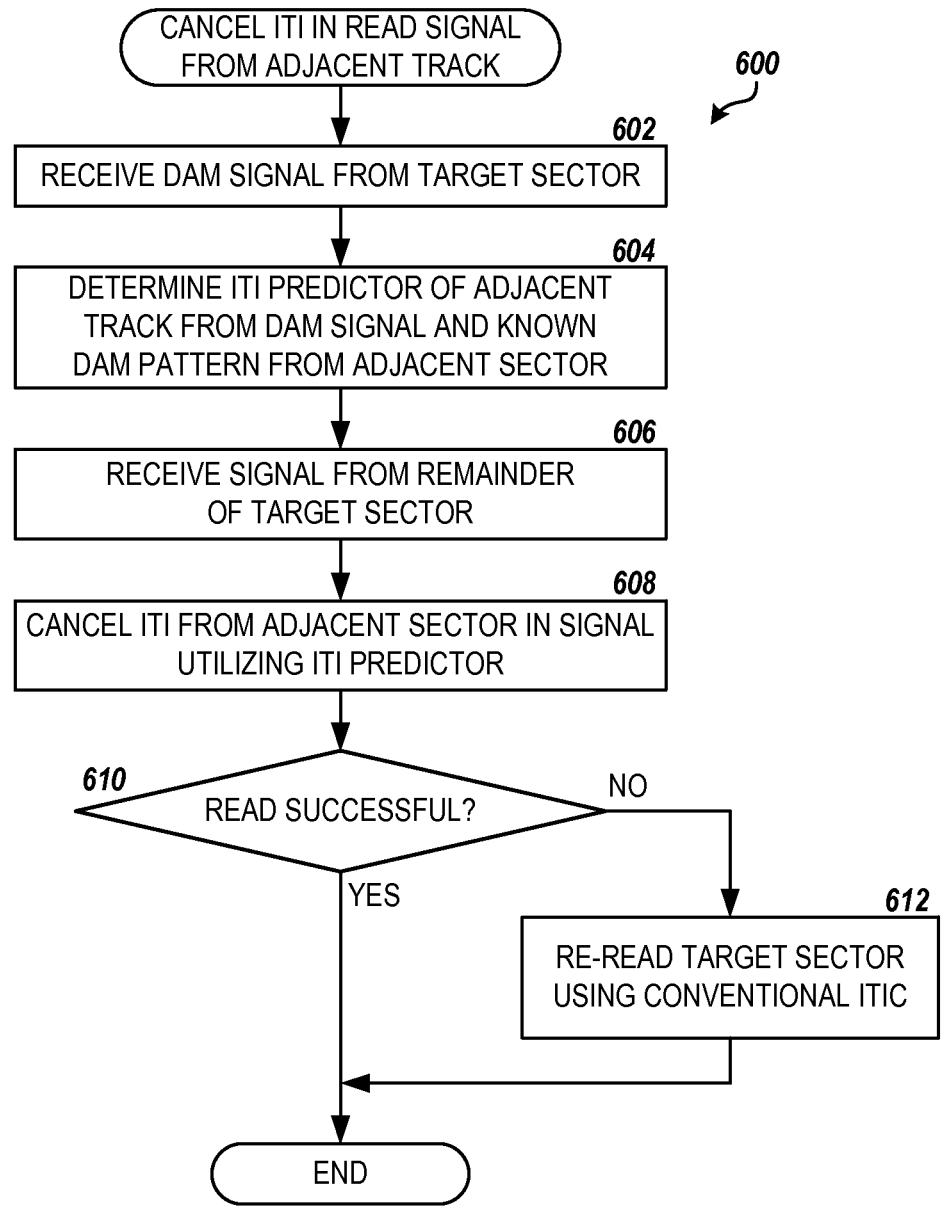
FIG. 6 is a flow diagram showing one routine for cancelling adjacent track interference using an inter-track interference predictor determined from predetermined data patterns in adjacent tracks, according to embodiments described herein.

FIG. 6 illustrates one routine 600 for cancelling adjacent track interference in a read signal utilizing an ITI predictor determined from predetermined data patterns in adjacent tracks, according to some embodiments. According to embodiments, the routine 600 may be performed by the ITIC module 228 of a storage device 200 during a read of a target sector 402A from a data track N 302A on a disk 202 of device. In further embodiments, the routine 600 may be performed by the controller 220 of the storage device 200, by external processors or computing systems performing storage processing in the storage device, or some other combination of modules, processors and devices.

The routine 600 begins at step 602, where the ITIC module 228 receives the DAM signal from the DAM 404A of the target sector 402A. As described above in regard to FIG. 4, the DAM 404A may immediately proceed the user data in the layout of the sector 402A and may contain one of two or more known, distinct data patterns. The DAM signal may be received by the read/write channel 226 from the read/write head 204 as it passes over the first portion of the target sector 402A on the disk 202, for example.

Next, the routine 600 proceeds to step 604, where the ITIC module 228 determines an ITI predictor value for an adjacent track, such as data track N−1 302B, indicating a prediction of the influence of the data stored in the adjacent track in the read signal from target data track N 302A. The ITI predictor value may be determined from the received DAM signal, the known DAM-B pattern contained in the DAM 404A of the target sector 402A, and the known DAM-A pattern contained in the DAM 404B of an aligned sector 402B on the adjacent track 302B. In some embodiments, the ITI predictor value may be a correlation factor indicating how the DAM 404B of the aligned, adjacent sector 402B influences the read signal from the DAM 404A of the target sector 402A. For example, the correlation factor A may be calculated from the formula:

$$\text{DAM-}B_N\text{Signal(read)}=(\text{DAM-}B_N+A^*\text{DAM-}A_{N-1})$$

Since DAM-B and DAM-A are known based on the data track of the corresponding sectors 402, the correlation factor A may be computed directly from the read signal of the DAM 404A from the target sector 402A. It will be appreciated that other methods may be utilized to determine the ITI predictor value based on the received DAM signal, the known DAM-B pattern contained in the DAM 404A of the target sector 402A, and the known DAM-A pattern contained in the DAM 404B of an aligned sector 402B on the adjacent track 302B, and it is intended that all such methods of calculating the ITI predictor value be included in this application.

From step 604, the routine 600 proceeds to step 606, where the ITIC module 228 receives the read signal from the remainder of the target sector 402A. The signal may be read through the read/write channel 226 by the read/write head 204 from the remaining portion of the target sector 402A on the disk 202. Because the DAM indicates that user data immediately follows, the received signal will contain the user data from the target sector along with any error correction data, according to some embodiments.

The routine 600 then proceeds from step 606 to step 608, where the ITIC module 228 cancels ITI from the adjacent track N−1 302B in the signal read from the remainder of the target sector 402A using the determined ITI predictor value. According to some embodiments, the ITIC module 228 may implement a conventional ITIC technique with the ITI predictor value as the ITI factor. In further embodiments, if the ITI predictor value indicates no ITI from the adjacent track 302B, then no ITIC may be performed and the user data may be decoded directly from the received signal.

Since ITI present in the DAM signal from the adjacent track N−1 302B is likely proportional to the ITI present in the signal from the remainder of the sector 402A following the DAM 404A, the ITI predictor value may be reliably used as the ITI factor in ITIC without requiring a read of the entire sector to determine ITI factor value(s). In this way, multiple reads of the target sector 402A are not necessary to compensate from adjacent track interference, thus increasing performance of reads in the storage device. In further embodiments, the ITIC module 228 may determine and utilize ITI predictor values for other adjacent tracks, such as track N+1 302C, track N−2 302D, track N+2 302E and the like in order compensate for ITI contributed by these tracks to the read signal in a fashion similar to that described in steps 604 and 608 above.

From step 608, the routine 600 proceeds to step 610, where it is determined if the read target sector 402A was successful. For example, the read/write channel 226 and/or controller 220 of the storage device 200 may decode the data from the received signal and utilize the error correction data to determine if the data was read correctly. If the data in the target sector 402A was read successfully, then the routine 600 ends. In the case where the read was not successful, e.g., where the ITI predictor value fail to correctly compensate for ITI from an adjacent track, then the routine 600 proceeds from step 610 to step 612, where the data from the target sector 402A is re-read using a conventional method of determining the ITI factor associated with the adjacent track(s) 302 and compensating for any ITI. Using this method, many sectors 402 can be expeditiously read in a single pass using the ITI predictor values, while the conventional technique can be used for those sectors where the ITI predictors fail. From step 612, the routine 600 ends.

Based on the foregoing, it will be appreciated that technologies for cancelling adjacent track interference in a read signal using an ITI predictor determined from predetermined data patterns in adjacent tracks are presented herein. While embodiments are described herein in regard to an HDD device, it will be appreciated that the embodiments described in this disclosure may be utilized to cancel adjacent track interference in any storage device containing data stored in substantially parallel or substantially concentric tracks on the storage media, including but not limited to, a magnetic disk drive, a hybrid magnetic and solid state drive, a magnetic tape drive, an optical disk storage device, an optical tape drive and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
    reading, by a controller of a storage device, a first signal from a first portion of a data track of a recording medium, the first portion containing a first predetermined data pattern;
    determining, by the controller, a value for an inter-track interference predictor associated with an adjacent track based on the first signal, the first predetermined data pattern, and a second predetermined data pattern contained in a corresponding portion of the adjacent track;
    reading, by the controller, a second signal from a second portion of the data track; and
    cancelling, by the controller, inter-track interference from the adjacent track in the second signal utilizing the value for the inter-track interference predictor.

2. The method of claim 1, wherein the second portion immediately follows the first portion in a single sector of the data track.

3. The method of claim 1, wherein the first portion of the data track and the corresponding portion of the adjacent track comprise adjacent data address marks.

4. The method of claim 1, further comprising repeating the steps for a second adjacent track adjacent to the data track.

5. The method of claim 1, wherein the first predetermined data pattern and the second predetermined data pattern are different, and wherein the first predetermined data pattern is written to all odd tracks of the recording medium and the second predetermined data pattern is written to all even tracks of the recording medium.

6. The method of claim 5, wherein the first predetermined data pattern and the second predetermined data pattern are selected such that their corresponding signals have a high cross-correlation.

7. The method of claim 1, wherein the value for the inter-track interference predictor comprises a correlation factor indicating an influence of the second predetermined data pattern contained in the adjacent track on the first signal read from the first portion of the data track containing the first predetermined data pattern.

8. The method of claim 1, further comprising the steps of:
    determine, by the controller, if the cancellation of the inter-track interference from the adjacent track in the second signal was successful; and
    if the cancellation of the inter-track interference from the adjacent track in the second signal was not successful, re-read the second signal from the second portion utilizing a conventional inter-track interference cancellation technique.

9. The method of claim 1, wherein the recording medium is a magnetic recording medium and the storage device is an HDD device.

10. A non-transitory computer-readable storage medium having processor-executable instructions stored thereon that, when executed by a processor, cause the processor to:
    read a first signal from a first portion of a target data area on a first track of a recording medium, the first portion containing a first predetermined data pattern;
    determine an inter-track interference predictor value associated with an adjacent track of the recording medium based on the first signal, the first predetermined data pattern, and a second predetermined data pattern contained in a corresponding portion of the adjacent track;
    read a second signal from a second portion of the target data area; and
    cancel inter-track interference from the adjacent track in the second signal utilizing the inter-track interference predictor value.

11. The non-transitory computer-readable storage medium of claim 10, wherein the target data area comprises a sector on the first track, the first portion comprises a data address mark in the sector, and the corresponding portion of the adjacent track comprise a data address mark of an aligned, adjacent sector on the adjacent track.

12. The non-transitory computer-readable storage medium of claim 10, wherein the first predetermined data pattern and the second predetermined data pattern are different, and wherein the first predetermined data pattern is written to all odd tracks of the recording medium and the second predetermined data pattern is written to all even tracks of the recording medium.

13. The non-transitory computer-readable storage medium of claim 12, wherein the first predetermined data pattern and the second predetermined data pattern are selected such that their corresponding signals have a high cross-correlation.

14. The non-transitory computer-readable storage medium of claim 10, wherein the inter-track interference predictor value comprises a correlation factor indicating an influence of the second predetermined data pattern contained in the adjacent track on the first signal read from the first portion of the target data area containing the first predetermined data pattern.

15. The non-transitory computer-readable storage medium of claim 10, having further processor-executable instructions stored thereon that cause the processor to:
 determine if the cancellation of the inter-track interference from the adjacent track in the second signal was successful; and
 if the cancellation of the inter-track interference from the adjacent track in the second signal was not successful, re-read the second signal from the second portion utilizing a conventional inter-track interference cancellation technique.

16. A system comprising:
 a hard disk drive comprising a storage medium;
 a processor operably connected to the hard disk drive; and
 an inter-track interference cancellation ("ITIC") module operably connected to the hard disk drive and the processor and configured to perform steps of
 receive a first signal from a data address mark ("DAM") of a target sector on a first track of a recording medium,
 determine an inter-track interference predictor value associated with an adjacent track of the recording medium based on the first signal, a known DAM pattern contained in the target sector, and a known DAM pattern contained in an aligned sector of the adjacent track,
 read a second signal from a remainder of the target sector, and
 cancel inter-track interference from the adjacent track in the second signal utilizing the inter-track interference predictor value.

17. The system of claim 16, wherein a first predetermined DAM pattern is written to all sectors of odd-numbered tracks of the recording medium and a second predetermined DAM pattern is written to all sectors of even-numbered tracks of the recording medium.

18. The system of claim 16, where the ITIC module is further configured to repeat the steps for a second adjacent track adjacent to the first track.

19. The system of claim 16, wherein the inter-track interference predictor value comprises a correlation factor indicating an influence of the DAM pattern contained in the aligned sector of the adjacent track on the on the first signal read from the DAM of the target sector.

20. The system of claim 16, where the processor is configured to perform steps of:
 determine if the cancellation of the inter-track interference from the adjacent track in the second signal was successful; and
 if the cancellation of the inter-track interference from the adjacent track in the second signal was not successful, re-read the second signal from the target sector utilizing a conventional inter-track interference cancellation technique.

* * * * *